Patented May 16, 1950

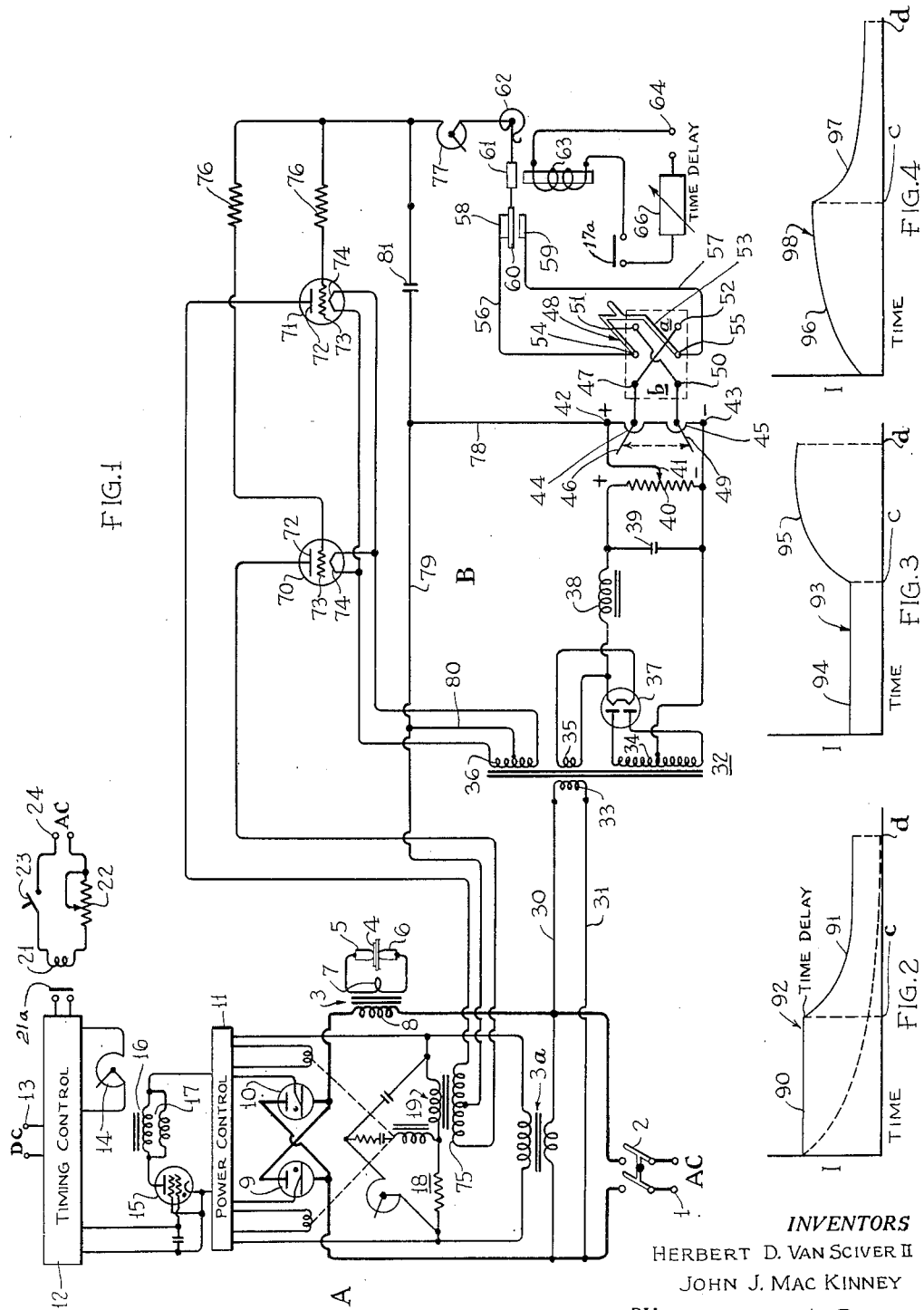

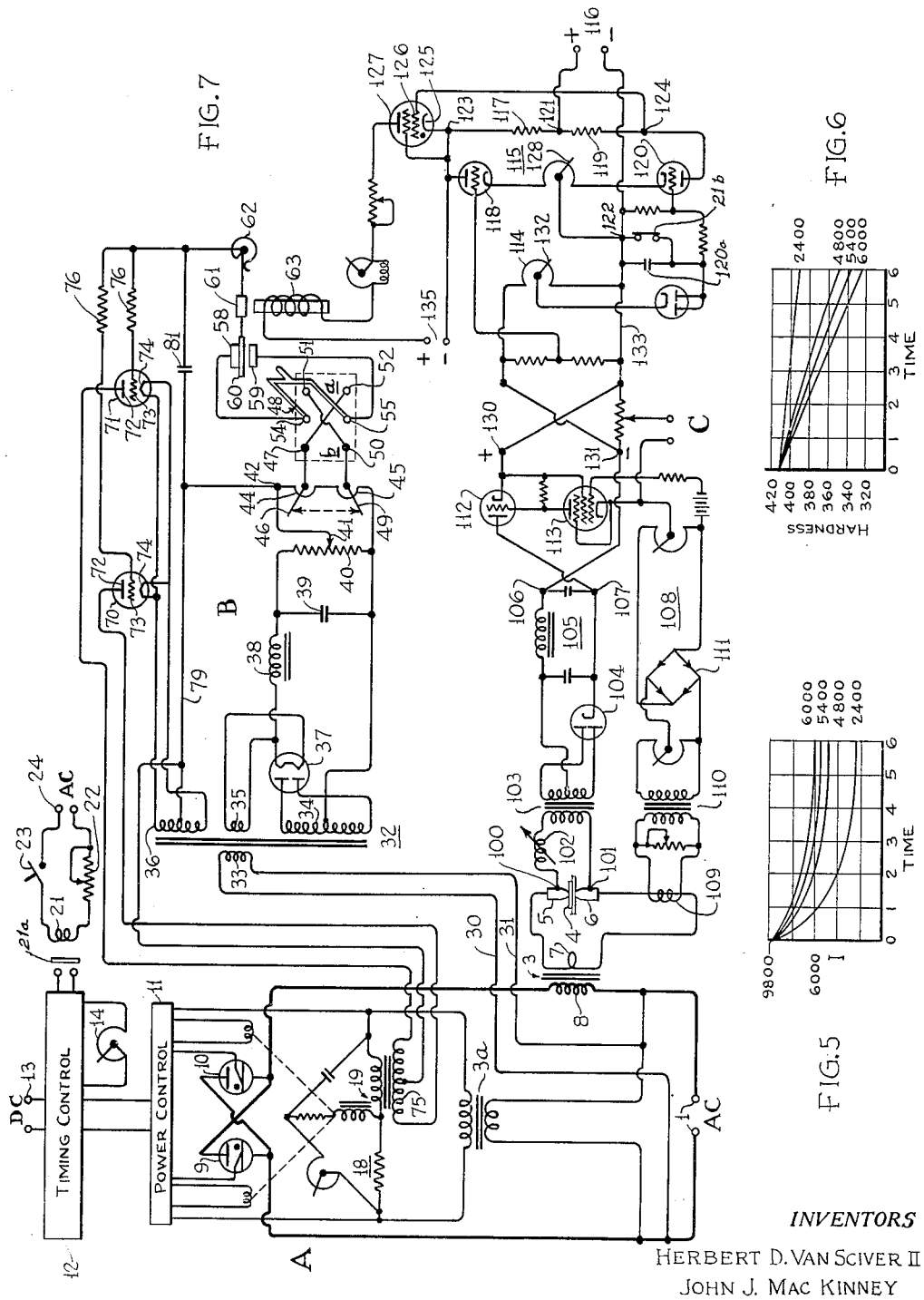

2,508,329

UNITED STATES PATENT OFFICE 2,508,329

METHOD AND APPARATUS FOR WELDING QUENCH-HARDENABLE STEELS

Herbert D. Van Sciver, II, Merion, and John J. MacKinney, Narberth, Pa., assignors to The Budd Company, Philadelphia, Pa., a corporation of Pennsylvania Application September 2, 1947, Serial No. 771,690

11 Claims. (Cl. 219—4)

This invention relates to the welding of quench-hardenable steels.

Certain steels, such as some of the so-called stainless steels, do not develop a hard brittle state on rapid cooling, but retain a satisfactory strength and ductility. Many steels, however, such as the low carbon alloy steels, on rapid cooling, as by quenching, become hard and brittle and require further tempering treatment to make the metal structure appropriate for use in various articles of manufacture. This applies to the welding of these steels wherein the weld is quenched by conduction and convection with sufficient rapidity to bring about the undesired characteristics mentioned.

It has been proposed to overcome the defective condition of welds of these quench-hardenable steels by subjecting the weld after the primary fusion and nugget formation to a second heat at a lower temperature to produce a tempering or drawing effect. Certain complex requirements, however, are involved in this method, such as control of weld current in the tempering step so as not to supply excessive heat. Also, the heat supplied for tempering may be a variable factor dependent upon the location of the weld or the size and thickness of the welded sheets.

An object of the present invention is to provide for quench-hardenable steels a method and apparatus for heat treating the metal of a nugget at the weld point so as to produce a weld which is of reduced hardness.

Another object of the invention is to provide means for controlling the current to maintain weld current flow after the weld without interruption, as a step in the prevention of hardness and brittleness in the welded area.

Still another object of the invention is to provide means in welding apparatus for reducing the current flow at the weld in decreasing decrements to a limiting value where normally the temperature resulting is above room temperature.

An object of the invention is to provide in a continuous operation the heating of hardenable steel above the critical temperature, followed by a decrease in temperature to the temperature range between limiting temperatures at which pearlite and martensite form.

An important object of the invention is to provide a simplified control of welding whereby current for heating may be supplied at continuously reduced increments to the point of weld, followed by a rapid decline to a limiting value of temperature substantially above room temperature.

An important object of the invention also is to provide control means for an electric resistance welding system in which current is supplied the weld until it attains the temperature of fusion and at the point of fusion, the current supply is diminished until a point above room temperature is reached.

Other objects of the invention pertain to the formation of Bainite welds in quench-hardenable steels by a single continuous operation; the provision of control means for welds producing a rapid initial decline of temperature after fusion, followed by a progressively reduced decline to a limiting value; the provision of a weld control system permitting supply of current at a constant preweld value to the point of fusion, followed by an increase of current flow to a limiting value above the preweld value; and in general the provision of control means for heating currents applicable to fusible products, wherein electric current may be supplied without interruption to the material at variable rates automatically to heat or cool the material to predetermined limiting values normally above room temperature.

The method and apparatus for accomplishing the above objects are indicated in the accompanying drawings, in which:

Figure 1 is a wiring diagram showing the application of the control to a welding circuit;

Figure 2 is a chart illustrating current values before and after a weld as supplied to the welding circuit in which the current supply after fusion is exponentially reduced to a limiting value corresponding to a point above room temperature;

Figure 3 is a chart similar to that of Fig. 2 but with the current supply increasing to a limiting value after the point of weld fusion;

Figure 4 is a chart similar to Fig. 2 but indicating variable increments of current prior to weld fusion and variable decrements after fusion;

Figure 5 is a family of curves showing current change from a common initial value to different reduced values;

Figure 6 is a chart indicating variations in hardness of a quench-hardenable steel for varying limiting temperatures of drop from the point of fusion corresponding to current values; and Figure 7 is a modification of the circuit of Fig. 1 in which the change of current supplied to the weld is initiated directly by the change of resistance of the weld at fusion.

Referring to Fig. 1, the circuit may be divided into sections lettered A and B, the A section including the conventional wiring of a resistance weld system and the B section including the specific current control of the present invention. In accordance with the showing of the A section of the circuit, alternating current power is supplied at terminals 1 through a double-pole switch 2 to the welding transformer 3. The workpiece 4 is positioned between the electrodes 5 and 6 connected in series with the secondary 7 of the transformer 3. Suitable holding and pressure equipment (not shown) is employed to manipulate the electrodes in relation to the workpiece. The primary coil 8 of welding transformer 3 is in series with the inversely connected ignitrons 9 and 10, the igniters of which are subject to appropriate power control 11. The power control is in turn subject to the timing control 12 as energized by the direct current source 13. The specific operating element of the timing control is shown as the variable resistor 14 which functions in conjunction with the timing tube 15 to determine the number of cycles of weld power application. The power control 11 includes the transformer 16, about which is placed in parallel, a relay coil 17 adapted to operate relay switches in the control section B as will be described hereinafter. The power control 11 also is associated with a phase shift unit 18 through transformer connection as indicated by broken lines. This phase shift unit is dependent for setting upon variation of the impedance 19 in the phase change bridge, the means for causing impedance variation being included in the current control section B. By varying the impedance 19 in the phase change unit 18, the point of initiation of current flow in respective successive half cycles of source current may be varied. Transformer 3a supplies current from the source 1 to the power control 11 and phase shift unit 18.

Initiation of the welding operation is brought about by closure of the switch 21a in the timing control. This switch may be a relay switch operable by the relay coil 21 in a separate initiating circuit including the variable resistor 22, the manual switch 23 and the source 24 of current. Other conventional initiating means may be utilized for starting the welding action of the system.

Reference now may be made to the B section of the circuit, supplying control over the phase shift 18 of the welding circuit A. By means of conductors 30 and 31, connection is made from the main power source 1 to the main transformer 32 of the control circuit. This transformer comprises a primary coil 33, a rectifier-supplying secondary coil 34 and two filament-supplying secondaries 35 and 36. The terminals of secondary 34 are connected to a full wave rectifying tube 37, having a filament supplied by transformer secondary 35. The output of this rectifier is filtered by reactor 38 and capacitor 39 and transmitted to a potentiometer 40, having a slider 41 for securing voltage variation at the output points 42 and 43. Across these two points are connected two secondary potentiometers 44 and 45. The slider 46 of potentiometer 44 is connected to terminal 47 of a double-pole, double-throw switch 48 and correspondingly, slider 49 of potentiometer 45 is connected to terminal 50 of this switch. The switch 48 includes terminal 51 connected to terminal 50, and terminal 52 connected to terminal 47, as well as the manual switch element 53 with an insulation cross bar and conducting blades pivoted at terminals 54 and 55 and movable to engage selectively either terminals 51 and 52, or terminals 47 and 50. For ease in description, when the switch is in position to engage terminals 51 and 52, it will be referred to as in the *a* position and when in engagement with terminals 47 and 50, in the *b* position.

It is apparent that by means of the switch 48, the output of the rectifier tube 37 from points 42 and 43, may be reversed as to polarity at switch terminals 54 and 55. Also, through use of the two potentiometers 44 and 45, it is possible to obtain a voltage shift on either side of a mean value.

Connected to switch terminals 54 and 55 by conductors 56 and 57, are fixed contacts 58 and 59. These contacts are placed in registry with a common switch member but spaced apart so that they may be selectively engaged by a switch member 60 fixedly secured to a pivoted armature 61. Normally the switch 60 is in engagement with the upper contact 58 through action of a spring element 62 but the armature is movable to bring the switch 60 into engagement with contact 59 on energization of the electromagnet 63. The electromagnet in turn is connected in a circuit including a power source 64, a relay switch 17a operated by relay coil 17, and a variable time delay switch 66. In this relay circuit, the relay switch 17a is normally open but subject to closure through energization of relay coil 17 in the A section of the circuit. The time delay switch 66 is adjustable at will to pre-set the time at which the relay 63 is energized after closure of the relay switch 17a.

The control circuit is completed by two electronic tubes of the vacuum type, numbered 70 and 71, each having an anode 72, grid 73 and cathode 74. The anode of each of these tubes is connected to one end of a coil 75 of the impedance transformer 19 in the phase change circuit of the A section. The grids 73 of these tubes are connected in parallel through resistors 76 and in series through variable resistor 77 to the armature 61 and switch 60 of the electromagnet 63. The cathodes 74 of these tubes are connected to the end terminals of secondary 36 of the main transformer 32. The grid circuit from the tubes is completed by switch 60, contacts 58 or 59, conductors 56 or 57, switch 48, potentiometers 44, 45 and conductors 78, 79 and 80 to the midpoint of transformer secondary 36. The circuit through the tubes is completed by connection from the midpoint of phase change transformer secondary 75 to conductor 80 and from this to the cathodes 74. A capacitor 81 is placed in parallel with the two grids across the direct current terminals 42 and 43.

The operation of the circuit of Fig. 1 will now be described. The main switch 2 is first closed, conditioning the load circuit for transmission of power, as well as the timing controls which are subject to closure of the timing control switch 21a. At the same time power is supplied the main transformer 32 in the B section, producing a direct current potential at output terminals 42 and 43. Assuming that the current form of Fig. 2 is desired, the manual switch 48 is moved to position *b* and the potentiometer sliders 46 and 49 so positioned as to secure for either potentiometer, the appropriate bias on the grids

73 of tubes 70 and 71. In position $b$ and with the armature 61 and switch 60 in its up position as held by the spring 62 so that contact is made between contact 58 and switch 60, the negative potential of the drop between point 42 and slider 46 is applied to the grids 73 of tubes 70 and 71 by way of switch terminals 47 and 54, conductor 56, contact 58, switch 60, resistors 77 and 76, grids 73, cathodes 74 and conductors 80, 79 and 78. For the two indicated positions of the potentiometer slides 46 and 49, the position 46 is that of minimum bias on the grids and hence, the effective resistance of the tubes 70 and 71 is at the lesser value for these positions and consequently, the effective impedance of coil 19 in the phase shift bridge is also at its lesser value at which a major portion of the positive half cycles of the voltage alternation represents current flow for heat supply at the weld point. This phase condition exists prior to closure of timing control switch 21$a$.

On closure of switch 21$a$ by actuation of the initiating switch 23, relay coil 17 in the A section closes relay switch 17$a$ in the time-delay relay circuit. The time-delay relay 66 is set to act at the end of the average time period necessary to produce fusion at the weld so that as soon as the relay switch 21$a$ closes, power is supplied the weld until the time delay switch acts, as shown in section 90 of curve 92 in Fig. 2, at which point the armature 61 moves switch 60 into engagement with contact 59 to break the circuit from potentiometer slider 46 and establish a circuit from slider 49 of potentiometer 45 through switch terminals 50 and 55, conductor 57, contact 59, switch 60, armature 61, resistors 77 and 76 to the grids 73 of tubes 70 and 71. In this way the grids are biased at the larger value, cutting down current flow through the tubes and thereby increasing the effective impedance of coil 19 in the phase shift bridge of section A and thereby reducing the segment of the current wave effective for supply of power to the load.

Without the capacitor 81, the phase shift on action of the time delay switch 66 would be immediate. However, through inclusion of the capacitor 81 in parallel connection across the grids of the tubes, the action of the armature 61, as brought about by the electromagnet 63, results in a non-rectilinear decline in current value as indicated by the section 91 of curve 92 in Fig. 2. As shown in this curve, the decline in current is at first rapid but with a decreasing decrement approaching a limiting value at a point spaced from the zero line as determined by the setting of the slider 49 in potentiometer 45 of the B section. The curve of the decline is exponential in shape as determined by the discharge of the capacitor 81 but it may assume other forms with modified equipment. The limiting point of the decline is set at a value above room temperature, preferably within a range of 300° F. and 1000° F. wherein for quench-hardenable steels, molecular stabilization produces the form of steel referred to as Bainite, an acicular structure developed between the pearlite and martensite zones. This structure has high strength and ductility and toughness so that welds formed thereof have the desirable attributes of tempered steel as distinguished from the brittle and excessively hardened welds produced in quench-hardenable steels by ordinary methods.

Following the dwell of the current at the limit of decline, as shown in the section 91 of curve 92 of Fig. 2, the length of which is experimentally determined for the best results, the timing control of section A of the circuit disconnects the power circuit and the current drops to zero.

The curve form 92 of Fig. 2 is one form of weld control which may be secured by the controlling action of the B section of the circuit. This form may be modified by changing values employed as for example, the time constant of the capacitor discharge, the magnitude of the initial current of section 90 and the final magnitude of the section 91 of the curve just prior to the timer cutoff. With regard to the horizontal section 90 of curve 92 of Fig. 2, it is to be understood that the capacitor 81 has been brought up to full charge before the welding current is applied to the electrodes. Switch 48 will have been preliminarily closed on the proper side to provide for this. Adjustment should be made to meet the requirements of the particular alloy under treatment. Also, it is apparent that modification of the curves of Fig. 2 may be obtained, such as shown in Figs. 3 and 4, by varying the degree of time delay of the unit 66 and the position of the double-pole switch 48 as to the $a$ and $b$ positions. If it be desired to secure the form of curve 93, as shown in Fig. 3, switch 48 is placed in the $a$ position prior to the start of the welding cycle and the time delay switch is set to operate at the end of the average time required for weld fusion as predetermined. With this setup, on supply of power to the welding circuit, a constant current is supplied the weld point as indicated by section 94 of curve 93, followed by an increase of current at the end of the predetermined weld period in accordance with the exponential section 95 of curve 93, the timing controls 12 functioning to cut off the current at the end of the timer period as in the case of the setup for Fig. 2.

To secure the current curve shown in Fig. 4 with a gradually increasing current supply up to the predetermined point of weld completion, followed by an exponential decline of current, the switch 48 should be set in the $a$ position and the time delay set to operate at zero time as soon as the power is applied. This produces a decreasing bias on the grids as modified by capacitor 81 up to the point of full charge, at which point the time delay switch is set to release the armature 61 and restore connection between the grids and the slider 49 of potentiometer 45, producing by the reverse action of capacitor 81 the greater value of bias on the grids 73 of tubes 70 and 71. There is thus produced the two sections 96 and 97 of curve 98 in Fig. 4.

Fig. 5 of the drawing is illustrative of the annealing action of the method as used by applicant on welds of quench-hardenable steels. In the upper part of the figure there is plotted, current against time, curves for different values of dwell drop from an initial heating current value of 9800 amperes, values of 2400, 4800, 5400 and 6000 amperes being indicated. This figure is drawn to indicate the decline in current value after weld fusion to the limiting value for a period of six seconds or 420 cycles. The corresponding hardness for the terminal times of the curves of Fig. 6 is shown where the curves are plotted with time and hardness coordinates according to the Vickers Pyramid Numbers (VPN) scale. It appears from Fig. 6 that a decline from 9800 amperes to 6000 amperes in the time of six seconds, produces a value in hardness of approximately 325 units as distinguished from a hardness of 412 units according to the usual welding methods. The curves of Fig. 6 moreover show values of hardness for the specified current changes for different time constants of exponential drop as for example, three seconds or 180 cycles. In review, it clearly appears that employing the control method as described, the hardness of the metal at the weld is definitely reduced, thus establishing for the weld the advantages of greater ductility and lack of brittleness as ordinarily secured by a separate tempering operation.

In Fig. 7 we have shown a modification of the invention of Fig. 1, in that the control or austempering action is initiated by the change of resistance occurring in the weld instead of making the current change dependent upon a preset arbitrary time period as developed in the time delay switch 66 of Fig. 1. To accomplish this result, utilization is made of the entire circuit of Fig. 1 as there indicated, there being substituted for the relay switch control 17, 17a of Fig. 1, auxiliary initiating means dependent upon the change of resistance of voltage at the weld point for each weld and indicated by circuit C in Fig. 7. The C circuit is essentially like that disclosed in the copending application of Edwin M. Callender, S. N. 630,401, filed November 23, 1945 and assigned to the assignee of the present application now Patent No. 2,472,043, granted May 31, 1949. A preliminary inspection of Fig. 7 will reveal that connections are made across the electrodes of the weld circuit to supply the control means which are led to the circuit of electromagnet 63 so that the functioning of this magnet is timed with electrical conditions arising from change of resistance at the weld point. In the following description of this C section, all of the numbers of Fig. 1 are retained where applicable in Fig. 7.

It is desired that change of voltage and resistance due to fusion at the weld point be utilized in energizing the electromagnet 63 and for this purpose, connection is made at the electrodes across the load at points 100 and 101, a circuit leading from these points through the tool-inductance compensating reactor 102, amplifying transformer 103, full wave rectifier 104, filter 105 to conductor points 106 and 107 where direct current voltage is available. Correction for current variation in the load circuit is made by use of the current change compensating unit 108, including the current transformer 109, amplifying transformer 110, and rectifier 111. This correction is impressed along with the tool-inductance compensated voltage-change signal from points 106 and 107, upon a tube system 112, 113 to produce at points 130, 131 a corrected potential drop through the potentiometer 114 effective as a percentage adjusting potentiometer. A bridge 115 is set up having bridge arms including resistor 117 and vacuum tube 118 on the one hand, and resistor 119 and vacuum tube 120 on the other hand, to which the power source 116 is connected at points 121 and 122. The output of the bridge 115 is from bridge terminals 123 and 124 to the cathode 125 and the control grid 126, respectively, of a gas tetrode 127.

The bridge 115 is normally set slightly unbalanced by means of the potentiometer slider 128, connected to bridge point 122 and its potentiometer connected to the cathodes of the bridge tubes. The grid of bridge tube 118 has a bias normally set by current flow from the control circuit at terminals 130 and 131, the voltage at these points being the corrected values for the control circuit. This bias accordingly is dependent upon the voltage between points 130 and 131, which are in turn dependent upon the initial voltage drop at the load between the electrodes of the load circuit. The bias impressed upon the control grid of tube 120 is determined by the percentage setting of the slider 132 of potentiometer 114. Current passing between the slider 132 and the conductor 133 of the control circuit serves to charge the capacitor 120a of a "memory circuit" when the discharge switch 21b is open and when the voltage through the weld drops upon fusion, the capacitor charge determines the current flow in tube 120. The reduced voltage at the grid of tube 118 at fusion allows this tube to become balanced as compared to tube 120 whose grid is biased by the pre-fusion voltage established by the capacitor 120a. Consequently, it appears that for a given percentage setting of the slider 132 of potentiometer 114 when the bridge is unbalanced initially prior to weld fusion, the control grid 126 of tube 127 acts to prevent flow of current from source 135 in the electromagnet circuit. However, as soon as a resistance and voltage change occurs at the weld, the bridge 115 becomes balanced positively, reducing the bias on grid 126 to the striking point and permitting a flow of current through the electromagnet 63. By this means, contact 60 is moved to engagement with contact 59 precisely at the point of weld fusion instead of at an average time interval, as predetermined, for bringing about fusion.

The preferred and alternative circuit arrangements for accomplishing the objects of the invention have been disclosed but it is apparent that, depending upon conditions involved such as the type of load metal and other operating conditions, modifications may be necessary; and hence, modifications of such nature are believed appropriately included within the scope of the invention.

What is claimed is:

1. A method of resistance welding metals such as quench-hardenable carbon alloy steels which comprises supplying electric current to the weld point in such quantity as normally to produce fusion, then immediately and without current cut-off reducing the heating current at weld fusion in decreasing decrements from the value at fusion to a value at which the weld temperature is maintained above room temperature, and finally reducing the current to zero.

2. Weld control apparatus comprising coacting electrodes, a power source for supplying power to said electrodes, switch means for connecting the power source to the electrodes, control means for progressively reducing the power supply in decreasing decrements at the weld after a time period in which weld completion normally results to a point at which the weld temperature is in excess of room temperature, and means for actuating said switch means to cut-off power supply to the weld after a time dwell of current flow at said super-room temperature value.

3. In electric weld control apparatus, welding electrodes adapted to receive a load, a power source connected to said electrodes for supplying alternating current power thereto, means for timing and interrupting the flow of power to said electrodes, means in said source-electrode connections for fixing the amount of electric current received by said electrodes from said source, and control means connected to said current fixing means for changing the point of current fixation thereof, said control means including devices for producing an exponential change of current flow in said control means, means for initiating action of said control current change means at a predetermined time point of the weld cycle, and means for establishing a limit of current flow in said control means and electrodes.

4. In electric weld control apparatus, welding electrodes adapted to receive a load, a power source connected to said electrodes for supplying electric current power thereto, means for timing and interrupting the flow of power to said electrodes, means in said source-electrode connections for fixing the amount of electric current received by said electrodes from said source, and control means connected to said current-fixing means for changing the point of current fixation thereof, said control means including devices for producing a change of current flow and means responsive to voltage change at weld fusion for initiating action of said current change means at the point of weld completion.

5. In electric weld control apparatus, welding electrodes adapted to receive a load, a power source connected to said electrodes for supplying alternating current power thereto, means for timing and interrupting the flow of power to said electrodes, means in said source-electrode connections for fixing the amount of electric current received by said electrodes from said source, and control means connected to said current-fixing means for changing the point of current fixation thereof, said control means including devices for changing gradually the point of current fixation both before and after a predetermined time interval in the weld cycle.

6. In electric weld control apparatus, welding electrodes adapted to receive a load, a power source connected to said electrodes for supplying alternating current power thereto, means for timing and interrupting the flow of power to said electrodes, means in said source-electrode connections for fixing the amount of electric current received by said electrodes from said source, and control means connected to said current-fixing means for changing the point of current fixation thereof, said control means including devices responsive to voltage change at weld fusion for changing gradually the point of current fixation both before and after the point in the weld cycle where the electrode voltage changes at weld fusion.

7. Weld control apparatus comprising coacting electrodes, a power source for supplying power to said electrodes, switch means for connecting said power source to the electrodes, control means for increasing gradually the power supply at the weld to the point of fusion and for reducing the power supply at the weld after a time period in which weld completion normally results to a point at which the weld temperature is in excess of room temperature, and means for actuating said switch means to interrupt power supply to the weld after a time dwell of current flow at said super-room temperature value.

8. A method of spot welding metals such as carbon alloy steels which comprises supplying current at an increasing rate to the weld point until fusion results, then at once without current cut-off reducing the current progressively from the value at fusion to a value at which a temperature above room temperature is obtained at the weld and finally reducing the current to zero.

9. In electric weld control apparatus, welding electrodes adapted to receive a load, a power source connected to said electrodes for supplying electric current power thereto, and means in said electrode-source connections for controlling the flow of power to the weld, said control means including switch means for setting the upper and lower limits of current flow through the weld point, a switch operating means for interchanging the switch limits, a timer for setting the time of switch change action, and means for imparting a gradual current change between the current change limits on actuation of said switch change by said timer.

10. In electric weld control apparatus, welding electrodes adapted to receive a load, a power source connected to said electrodes for supplying electric current power thereto, and means in said electrode-source connections for controlling the flow of power to the weld, said control means including switch means for setting the upper and lower limits of current flow through the weld point, a switch operating means for interchanging the switch limits, a timer for setting the time of switch change action, and means for decreasing the current flow at the weld with progressively decreasing decrements of change approaching zero to the lower current change limit immediately following fusion at the weld point and change of said switch from the upper to the lower limit position, and means for reducing the current to zero following a time dwell of current at said lower change limit.

11. A method of spot welding metals such as carbon alloy steels which comprises supplying electric current to the weld point in such quantity as to produce fusion, establishing a prefusion charge before voltage change at fusion, setting up a comparison between existing postfusion voltage and the record charge of prefusion voltage and providing a current change action in response to this comparison and immediately and without current cut-off reducing the heating current at weld fusion progressively from the value at fusion to a value at which the weld temperature is maintained above room temperature, and finally reducing the current to zero.

HERBERT D. VAN SCIVER, II.
JOHN J. MacKINNEY.

REFERENCES CITED

The following references are of record in the file of this patent:

UNITED STATES PATENTS

| Number | Name | Date |
|---|---|---|
| 1,975,753 | Delano et al. | Oct. 2, 1934 |
| 2,210,710 | Diamond et al. | Aug. 6, 1940 |
| 2,243,833 | Bohn | June 3, 1941 |
| 2,289,320 | Callom | July 7, 1942 |
| 2,363,719 | Cooper et al. | Nov. 28, 1944 |